(12) United States Patent
Nakamura

(10) Patent No.: US 10,030,129 B2
(45) Date of Patent: Jul. 24, 2018

(54) RUBBER COMPOSITION FOR TIRE, TIRE, AND METHOD FOR MANUFACTURING THE TIRE

(71) Applicant: TOYO TIRE & RUBBER CO., LTD., Osaka-shi, Osaka (JP)

(72) Inventor: Fumihiko Nakamura, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 15/201,982

(22) Filed: Jul. 5, 2016

(65) Prior Publication Data

US 2017/0009064 A1    Jan. 12, 2017

(30) Foreign Application Priority Data

Jul. 7, 2015 (JP) ................. 2015-136129

(51) Int. Cl.
| | |
|---|---|
| *C08L 9/00* | (2006.01) |
| *C08L 3/02* | (2006.01) |
| *C08L 1/02* | (2006.01) |
| *C08L 7/00* | (2006.01) |
| *B60C 1/00* | (2006.01) |
| *B29D 30/06* | (2006.01) |
| *B29K 9/06* | (2006.01) |
| *B29K 7/00* | (2006.01) |
| *B29K 601/00* | (2006.01) |
| *B29K 105/04* | (2006.01) |
| *B29K 105/16* | (2006.01) |

(52) U.S. Cl.
CPC .............. *C08L 9/00* (2013.01); *B60C 1/0016* (2013.01); *C08L 7/00* (2013.01); *B29D 30/0601* (2013.01); *B29K 2007/00* (2013.01); *B29K 2009/06* (2013.01); *B29K 2105/04* (2013.01); *B29K 2105/16* (2013.01); *B29K 2601/00* (2013.01); *B29K 2603/00* (2013.01)

(58) Field of Classification Search
CPC ................. C08L 9/00; C08L 3/02; C08L 1/02
See application file for complete search history.

(56) References Cited

U.S. PATENT DOCUMENTS

| | | | | |
|---|---|---|---|---|
| 5,008,310 A | * | 4/1991 | Beshay ................. | C08K 9/04 524/13 |
| 5,672,639 A | * | 9/1997 | Corvasce ................. | B60C 1/00 152/450 |
| 6,269,858 B1 | * | 8/2001 | Sandstrom ................. | B60C 1/00 152/209.1 |
| 2002/0037950 A1 | | 3/2002 | Mizuno et al. | |
| 2003/0092801 A1 | * | 5/2003 | Agostini ................. | C08K 5/548 524/27 |
| 2004/0019135 A1 | | 1/2004 | Horiguchi et al. | |
| 2004/0024093 A1 | * | 2/2004 | Weydert ................. | C08L 7/00 524/47 |
| 2005/0101718 A1 | * | 5/2005 | Lechtenboehmer ...... | B60C 1/00 524/492 |
| 2012/0232192 A1 | * | 9/2012 | Tochika ................. | B60C 1/0016 524/45 |
| 2013/0331518 A1 | * | 12/2013 | Immonen ................. | C08J 5/045 525/54.21 |
| 2014/0190608 A1 | * | 7/2014 | Katsuno ................. | B60C 11/00 152/209.18 |
| 2016/0032086 A1 | * | 2/2016 | Takaoka ................. | B60C 1/00 524/35 |
| 2017/0001336 A1 | * | 1/2017 | Tamai ................. | B29B 9/065 |

FOREIGN PATENT DOCUMENTS

| | | |
|---|---|---|
| JP | 2004-18603 A | 1/2004 |
| JP | 2005-133025 A | 5/2005 |
| JP | 2007-112834 A | 5/2007 |
| JP | 2011-12110 A | 1/2011 |

OTHER PUBLICATIONS

Meng et al., Journal of Applied Polymer Science, 2013, 4534-4541.*
Office Action dated Sep. 15, 2017, issued in counterpart Chinese Application No. 201610532486.2, with English translation. (11 pages).

* cited by examiner

*Primary Examiner* — Liam J Heincer
(74) *Attorney, Agent, or Firm* — Westerman, Hattori, Daniels & Adrian, LLP

(57) ABSTRACT

A rubber composition for a tire comprises 100 parts by mass of a rubber component comprising diene rubber, and from 0.5 to 20 parts by mass of pellets comprising paper powder and starch and having water content of 5 mass % or more. A tire is provided with a tread rubber part comprising a foamed rubber formed by the rubber composition. A method for manufacturing a tire comprises mixing from 0.5 to 20 parts by mass of pellets comprising paper powder and starch and having water content of 5 mass % or more with 100 parts by mass of a rubber component comprising diene rubber to prepare a rubber composition, producing an unvulcanized tire using the rubber composition obtained, and vulcanization molding the unvulcanized tire.

12 Claims, No Drawings

RUBBER COMPOSITION FOR TIRE, TIRE, AND METHOD FOR MANUFACTURING THE TIRE

CROSS-REFERENCE TO RELATED APPLICATIONS

This application is based upon and claims the benefit of priority from the prior Japanese Patent Application No. 2015-136129, filed on Jul. 7, 2015; the entire contents of which are incorporated herein by reference.

BACKGROUND

1. Field of the Invention

The present invention relates to a rubber composition suitable for use in a tire, a tire using the rubber composition, and a method for manufacturing a tire.

2. Related Art

An icy and snowy road surface has remarkably low friction coefficient as compared with an ordinary road surface and becomes slippery. For this reason, in a tread rubber of a tire for winter season (winter tire) such as a studless tire or a snow tire, its rubber hardness is set low using diene rubber having low glass transition temperature in order to enhance running performance on an icy and snowy road surface (hereinafter simply referred to as "on-ice performance). Furthermore, to increase friction force to an icy and snowy road surface, a method of forming a tread rubber by foamed rubber, a method of adding vegetable granules, a pulverized product of porous carbonized material, porous cellulose particles or the like to a tread rubber, and the like are proposed (for example, JP-A-2011-012110).

US2004/0019135A1 proposes adding short fibers, particles having Mohs hardness of 5 or higher, and a starch/plasticizer composite material to diene rubber in order to improve on-ice performance and wet grip performance. Furthermore, US2002/0037950A1 proposes adding short fibers, used paper and silica to diene rubber in order to improve on-ice performance.

On the other hand, although not related to on-ice performance, JP-A-2007-112834 discloses to increase rigidity of a rubber composition for a tire by adding paper fibers and a phenol type curing resin to diene rubber. Furthermore, JP-A-2005-133025 discloses to improve abrasion resistance by adding starch and cellulose to diene rubber.

Thus, in a rubber composition for a tire, use of starch is disclosed in US2004/0019135A1 and JP-A-2005-133025, and use of used paper and paper fibers is disclosed in US2002/0037950A1 and JP-A-2007-112834. However, those patent documents do not disclose to use pellets comprising a mixture of paper powder and starch and containing a given amount of water.

On the other hand, JP-A-2004-018603 discloses pellets comprising a mixture of starch, paper powder and an inorganic compound and containing water. However, this patent document relates to pellets as a raw material of a foamed body prepared using an extruder, and does not suggest that the pellets are used in a rubber composition.

As described above, the technology of using a foamed rubber in a tread rubber in order to improve on-ice performance of a tire has been known. Conventionally, an organic solvent is used as a foaming agent for the foamed rubber. However, where a rubber is foamed using an organic solvent, load applied to environment is large. Furthermore, to improve on-ice performance, there is the technology of adding hard particles having scratch effect and porous particles having removal effect of water screen on the ice. However, sufficient effect is not always obtained by only the addition of those particles, and further improvement of on-ice performance is required.

SUMMARY

In view of the above, an object of the present embodiment is to improve on-ice performance in a rubber composition for a tire and a tire.

A rubber composition for a tire according to the present embodiment comprises 100 parts by mass of a rubber component comprising diene rubber, and from 0.5 to 20 parts by mass of pellets comprising paper powder and starch and having water content of 5 mass % or more.

A tire according to the present embodiment has a tread rubber part comprising a foamed rubber formed by the rubber composition.

A method for manufacturing a tire according to the present embodiment comprises mixing from 0.5 to 20 parts by mass of pellets comprising paper powder and starch and having water content of 5 mass % or more with 100 parts by mass of a rubber component comprising diene rubber to prepare a rubber composition, producing an unvulcanized tire using the rubber composition obtained, and vulcanization molding the unvulcanized tire.

According to the present embodiment, on-ice performance of a tire can be improved by adding pellets comprising paper powder and starch to a rubber composition for a tire.

DETAILED DESCRIPTION

Elements for carrying out the present embodiment are described in detail below.

A rubber composition according to the present embodiment comprises a rubber component comprising diene rubber, having added thereto pellets comprising paper powder and starch.

Examples of the diene rubber used as a rubber component include various diene rubbers generally used in a rubber composition for a tire tread, such as natural rubber (NR), polyisoprene rubber (IR), polybutadiene rubber (BR), styrene-butadiene rubber (SBR), styrene-isoprene copolymer rubber, butadiene-isoprene copolymer rubber and styrene-isoprene-butadiene copolymer rubber. Those diene rubbers can be used in any one kind alone or as blends of two or more kinds.

As the rubber component, a blend of natural rubber and other diene rubber is preferably used, and a blend of natural rubber (NR) and polybutadiene rubber (BR) is particularly preferably used. Although not particularly limited, considering a balance between low temperature characteristics of the rubber composition and processability and tear resistance, a ratio of NR/BR is preferably from 30/70 to 80/20, and may be from 40/60 to 70/30, in mass ratio.

The pellets are a mixture of paper powder and starch, and contain a given amount of water. On-ice performance can be remarkably improved by mixing the pellets comprising paper powder and starch as main components with the rubber component. In detail, the pellets contain water. Therefore, water vapor foaming can be performed by the water, and as a result, a foamed rubber can be obtained by vulcanization molding. Additionally, water absorption effect and scratch effect by paper powder and starch are developed. As a result, on-ice performance can be greatly improved. Furthermore, a rubber can be foamed during vulcanization by using the pellets without using the conventional foaming agent such as an organic solvent. Therefore, loads on environment can be reduced.

The paper powder is a powder containing paper fibers that are plant fibers, and a fine powder obtained by pulverizing paper with a pulverizing machine or the like can be used. As the paper, unused paper or used paper can be used. Use of pulverized used paper powder gives consideration to environment and becomes useful utilization of resources. The used paper may be paper usable as a recycled paper, and further may be waste or discarded used paper that cannot be reused, such as shredder scraps. Recycling of waste used paper can further bring about effective utilization of resources. Furthermore, edge material of paper such as broken paper or spoilage, generated when preparing a paper may be used. In other words, it is preferred as paper powder to use a powder obtained by pulverizing at least one selected from the group consisting of used paper (more preferably waste used paper) and edge material of paper. This brings about low environmental load and leads to reduction in cost. Pulp as a raw material of paper may comprise wood pulp and may comprise non-wood pulp.

The starch is a hydrophilic natural polymer derived from plants, and functions as a binder for adhering paper powder. The starch generally has a powdery shape, and such powdery starch is preferably used in the present embodiment. Examples of the starch include potato starch, sweet potato starch, cornstarch, rice starch, wheat starch, tapioca starch, modified starch and processed starch. Those starches can be used in any one kind alone or as mixtures of two or more kinds. As the starch, powdery starch as it is may be used, and fine powder obtained by pulverizing the starch using a pulverizing machine or the like may be used.

Particle diameter of the paper powder and powdery starch is not particularly limited. For example, the average particle diameter of those may be from 10 to 200 μm. The average particle diameter of the paper powder and powdery starch is obtained by obtaining an image by microscopic observation, measuring long diameter and short diameter (in the case where the long diameter and short diameter are the same, a length in a certain axis direction and a length in an axis direction perpendicular to the certain axis direction) in 100 particles using the image, and calculating the average value of those.

The content of the paper powder contained in the pellets is preferably 20 mass % or more in dry mass basis. The dry mass basis used herein means a ratio to mass of pellets excluding water contained. When the proportion of the paper component is 20 mass % or more, environmental load can be reduced and costs can be suppressed. Furthermore, the possibility of disappearance of pellets during the mixing of a rubber composition can be reduced by enhancing strength of the pellets. The content of the paper powder is preferably from 20 to 60 mass %, and more preferably from 30 to 50 mass %, in dry mass basis.

The content of the starch contained in the pellets is not particularly limited, and may be, for example, from 20 to 80 mass %, may be from 40 to 80 mass %, and may be from 50 to 70 mass %, in dry mass basis.

The pellets may contain plant fibers other than paper, and hydrophilic polymer other than starch, in addition to the paper powder and starch, and may further contain an inorganic compound such as titanium oxide or talc, and a thermoplastic synthetic resin such as polypropylene or polyethylene. As one embodiment, the pellets may contain a powder of an inorganic compound in an amount of 35 mass % or less in dry mass basis, and may contain a powder of a thermoplastic synthetic resin in an amount of less than 50 mass % in dry mass basis. In one embodiment, the pellets may not contain a powder of an inorganic compound and/or a powder of a thermoplastic synthetic resin.

Pellets having water content of 5 mass % or more are used. When the water content is 5 mass % or more, a vulcanized rubber can be formed into a foamed rubber by water vapor foaming in the vulcanization molding of a rubber composition. The water content of the pellets used herein is a ratio of mass of the water to mass of the entire pellets containing water. The water content of the pellets is preferably from 5 to 50 mass %, and more preferably from 10 to 40 mass %, and may be 15 to 35 mass %.

The pellets are a material obtained by solidifying a mixture containing paper powder and starch into a granular form (that is, a pelletized material). The shape of the pellets is not particularly limited, and may be a spherical shape, a columnar shape or a square pillar shape. The size of the pellets is not particularly limited. For example, the size may be from 0.5 to 50 mm$^3$, and may be from 1 to 20 mm$^3$, in terms of volume. In more detail, for example, in the case of a spherical shape, its diameter may be from about 1 to 3 mm. In the case of a columnar shape, its diameter may be from about 1 to 3 mm, and its length is from about 0.5 to 5 mm. In the case of a square pillar shape, one side of a bottom may be from about 1 to 3 mm, and its length is from about 0.5 to 5 mm. The shape of the pellets contained in an unvulcanized rubber composition may be a shape in which a shape before adding to a rubber component is maintained, and may be a shape in which a part of pellets is collapsed or broken by shear force or the like during kneading.

The pellets preferably melt at a temperature of 150° C. or higher. When the melting temperature of the pellets is 150° C. or higher, softening, deformation, collapse and the like of the pellets in a mixing step of a rubber composition and the subsequent extrusion step are suppressed, and as a result, poor foaming in the vulcanization molding can be suppressed. The melting temperature of the pellets is preferably from 150 to 180° C., and more preferably from 150 to 160° C.

A method for producing the pellets is not particularly limited. As one embodiment, the pellets can be prepared as follows according to the method disclosed in JP-A-2004-018603. Paper powder and powdery starch are introduced in a kneading machine together with water, and those powders are kneaded together with water by the rotation of screws arranged in the kneading machine, thereby obtaining a clay-like fluid mixture having viscosity. The mixing in such a case is performed at a temperature to an extent such that the powdery starch does not change into a paste-like material. The fluid mixture obtained above is then extruded using an extrusion granulator, cut into a given length, and then naturally dried, thereby obtaining pellets. The paper powder and powdery starch are nearly uniformly dispersed in the pellets obtained.

The content of the pellets in the rubber composition is preferably a range of from 0.5 to 20 parts by mass per 100 parts by mass of the rubber component. The content of the pellets of 0.5 parts by mass or more can develop excellent improvement effect of on-ice performance. Furthermore, the content of the pellets of 20 parts by mass or less can suppress deterioration of abrasion resistance. The content of the pellets is more preferably from 1 to 15 parts by mass, and still more preferably 3 to 15 parts by mass.

The rubber composition according to the present embodiment may contain at least one kind of anti-slip materials selected from the group consisting of a pulverized product of porous carbonized material of a plant, porous cellulose particles and vegetable granules, together with the pellets. On-ice performance can be further improved by the use of those anti-slip materials in combination with the pellets.

The pulverized product of porous carbonized material is a pulverized product obtained by pulverizing a porous substance comprising a solid product comprising, as a main component, carbon obtained by carbonizing plants such as a tree or a bamboo. A pulverized product of bamboo charcoal (bamboo charcoal pulverized product) may be used as one example of the pulverized product of porous carbonized material. Examples of a bamboo material as a raw material of bamboo charcoal include various bamboos such as moso bamboo, Japanese timber bamboo, Henon bamboo and Leopard bamboo and further include bamboo grasses such as Chidori bamboo grass and Sendai bamboo grass. The pulverized product of bamboo charcoal can be obtained by pulverizing bamboo charcoal obtained by smothering and carbonizing a bamboo material using a kiln into a powder using the conventional pulverizing machine (such as ball mill).

The particle diameter of the pulverized product of porous carbonized material is not particularly limited. For example, 90% volume particle diameter (D90) may be from 10 to 500 µm, and may be from 50 to 300 µm. D90 means a particle diameter at an integrated value 90% in a particle size distribution (volume basis) measured by a laser diffraction/scattering method, and, for example, is obtained by a laser diffraction particle size analyzer "SALD-2200" manufactured by Shimadzu Corporation in which red semiconductor laser (wavelength: 680 nm) is used as a light source.

Cellulose particles having a porous structure in which porosity is from 75 to 95% are used as the porous cellulose particles. The porosity is preferably from 80 to 90%. The porosity can be obtained from the following formula by measuring a volume of a certain mass of a sample (that is, the porous cellulose particles) with a measuring cylinder and obtaining a bulk specific gravity.

Porosity (%)={1−(bulk specific gravity [g/ml] of sample)/(true specific gravity [g/ml] of sample)}×100

True specific gravity of cellulose is 1.5.

Cellulose particles obtained by adding a perforating agent to an alkali type cellulose solution such as viscose and simultaneously proceeding the coagulation/regeneration of cellulose and the foaming by the perforating agent can be used as the porous cellulose particles. The porous cellulose particles are commercially available as "VISCOPEARL" manufactured by Rengo Co., Ltd., and further are described in JP-A-2001-323095 and JP-A-2004-115284, and those porous cellulose particles can be preferably used.

The particle diameter of the porous cellulose particles is not particularly limited. For example, the average particle diameter may be from 5 to 1,000 µm, preferably from 100 to 800 µm, and may be from 200 to 800 µm. Spherical particles having a ratio of long diameter/short diameter of from 1 to 2 are preferably used as the porous cellulose particles. The average particle diameter of the porous cellulose particles can be obtained similar to the average particle diameter of the paper powder and powdery starch as described before. The ratio of long diameter/short diameter is obtained from the average value of values obtained by dividing the long diameter by the short diameter using long diameter and short diameter of 100 particles measured when obtaining the average particle diameter.

Examples of the vegetable granules include pulverized products obtained by pulverizing at least one kind selected from the group consisting of shells of seeds, stones of fruits, grains and cores of grains. Specific examples of the vegetable granules include pulverized products obtained by pulverizing seed shells and fruit stones, such as walnut, apricot, camellia, peach, plum, ginkgo, peanut, chestnut and the like; grains such as rice, wheat, millet, barnyard millet, corn and the like; and grain cores such as corncob, by the conventional method. Those pulverized products have Mohs harness of from about 2 to 5, and are harder than ice. Therefore, those pulverized products develop scratch effect to an ice-covered road surface. The average particle diameter of the vegetable granules is not particularly limited. For example, 90% volume particle diameter (D90) may be from 10 to 600 µm, may be from 150 to 500 µm, and may be from 200 to 400 µm.

Of those anti-slip materials, hard particles such as vegetable granules have scratch effect. Therefore, when the hard particles are used in combination with the pellets, on-ice performance can further be improved.

On the other hand, porous particles such as the pulverized product of porous carbonized material and the porous cellulose particles have the removal effect of water screen present on an ice-covered load surface. Therefore, when those are used in combination with the pellets, on-ice performance can be further improved. Furthermore, when the porous particles are used in combination with the pellets, it is considered that a part of water contained in the pellets can be incorporated in pores of the porous particles, the amount of water discharged outside when mixing the rubber composition can be reduced, and therefore foaming ratio can be increased. For this reason, the combined use of the porous particles and pellets is further excellent in the improvement effect of on-ice performance, as compared with the combined use of the vegetable granules and pellets.

In the case of adding those anti-slip materials, the amount of the anti-slip materials added is preferably from 0.5 to 20 parts by mass, and more preferably from 1 to 10 parts by mass, per 100 parts by mass of the rubber component. The addition amount of the porous particles comprising the pulverized product of porous carbonized material and/or porous cellulose particles is preferably from 0.5 to 20 parts by mass, and more preferably from 1 to 10 parts by mass, per 100 parts by mass of the rubber component. The amount of the vegetable granules added is preferably from 0.5 to 10 parts by mass, and more preferably from 1 to 5 parts by mass, per 100 parts by mass of the rubber component.

The rubber composition according to the present embodiment can appropriately contain compounding chemicals generally used in rubber industries, such as a filler such as carbon black or silica, a process oil, zinc flower, stearic acid, a wax, a softener, a plasticizer, an age resister (amine-ketone type, aromatic secondary amine type, phenol type, imidazole type or the like), a vulcanizing agent and a vulcanization accelerator (guanidine type, thiazole type, sulfenamide type, thiuram type or the like) in ordinary ranges, in addition to each of the above-described components.

The carbon black is not particularly limited, and can use the conventional various kinds of carbon black. For example, in the case where the rubber composition is used in a tread part of a winter tire such as a studless tire, carbon black having a nitrogen adsorption specific surface area ($N_2SA$) (JIS K6217-2) of from 70 to 150 $m^2/g$ and DBP oil absorption amount (JIS K6217-4) of from 100 to 150 ml/100 g is preferably used from the standpoints of low temperature performance, abrasion resistance performance and reinforcement of a rubber. Specific examples of the carbon black include carbon black of SAF grade, ISAF grade and HAF grade. The amount of the carbon black added is preferably from 10 to 80 parts by mass, and more preferably from 15 to 50 parts by mass, per 100 parts by mass of the rubber component.

Silica is not particularly limited. For example, wet silica such as wet precipitated silica or wet gelled silica is preferably used. BET specific surface area (measured according to BET method described in JIS K6430) of silica is not particularly limited. The BET specific surface area is preferably from 90 to 250 m$^2$/g, and more preferably from 150 to 220 m$^2$/g. The amount of the silica added is preferably from 10 to 50 parts by mass, and more preferably from 15 to 50 parts by mass, per 100 parts by mass of the rubber component. In the case where the silica is added to the rubber composition, it is preferred to concurrently use a silane coupling agent such as sulfide silane or mercaptosilane. The amount of the silane coupling agent used is preferably from 2 to 20 mass % based on the amount of the silica added.

The amount of the filler added comprising carbon black and/or silica is not particularly limited. For example, the amount may be from 10 to 150 parts by mass, may be from 20 to 100 parts by mass, and may be from 30 to 80 parts by mass, per 100 parts by mass of the rubber component.

Examples of the vulcanizing agent include sulfurs such as powdered sulfur, precipitated sulfur, colloidal sulfur, insoluble sulfur and highly dispersive sulfur. Although not particularly limited, the amount of the vulcanizing agent added is preferably from 0.1 to 10 parts by mass, and more preferably from 0.5 to 5 parts by mass, per 100 parts by mass of the rubber component. The amount of the vulcanization accelerator added is preferably from 0.1 to 7 parts by mass, and more preferably from 0.5 to 5 parts by mass, per 100 parts by mass of the rubber component.

The method for manufacturing a tire according to the present embodiment comprises a step of mixing (that is, kneading) the pellets comprising paper powder and starch and having water content of 5 mass % or more with a rubber component comprising diene rubber to prepare the rubber composition, a step of producing an unvulcanized tire using the rubber composition obtained, and a step of vulcanization molding the unvulcanized tire obtained.

The preparation of the rubber composition can be conducted using a kneading machine generally used, such as Banbury mixer, a kneader or rolls, and is not particularly limited.

The preparation step of the rubber composition according to the one preferred embodiment comprises a nonproductive mixing step of adding a filler to the rubber component, followed by mixing (kneading), and a productive mixing step of adding the pellets to the nonproductive rubber mixture obtained in the nonproductive mixing step together with a vulcanizing agent, followed by mixing (kneading), wherein the mixing temperature in the productive mixing step is set to 120° C. or lower. The mixing in the nonproductive mixing step is generally conducted until reaching high temperature in order to uniformly disperse the filler. The productive mixing step is conducted at lower temperature in order to suppress the reaction of the vulcanizing agent. By adding the pellets in the productive mixing step, not in the nonproductive mixing step, and setting the mixing temperature to 120° C. or lower, water contained in the pellets can be suppressed from evaporating before the vulcanization molding step and discharging outside, and the foaming effect in the vulcanization molding step can be enhanced.

The nonproductive mixing step is a kneading step in the state that a part of components, such as a vulcanizing agent, is not added, and components excluding a vulcanizing agent and a vulcanization accelerator, such as a filler, an oil and an age resistor, are added to the rubber component, followed by mixing. The nonproductive mixing step can be conducted using a closed kneading machine such as Banbury mixer. Each of the above components is introduced in the kneading machine, and kneading that is dry mixing to which mechanical shear force is added is conducted. When the mixing is conducted, the temperature is increased by the generation of heat due to shearing. Therefore, the mixture (nonproductive rubber mixture) is discharged from the kneading machine at a given discharge temperature. The mixing temperature in the nonproductive mixing step (for example, discharge temperature from the kneading machine) is not particularly limited, and, for example, may be from 130 to 180° C., and may be from 140 to 180° C. The nonproductive rubber mixture discharged from the kneading machine is generally cooled by allowing it to stand at ordinary temperatures. The nonproductive mixing step may be a single mixing step, but may be carried out by dividing into a plurality of mixing steps in which mixing and discharging are repeated. Furthermore, a re-milling step in which only kneading is conducted without adding additives may be carried out among a plurality of mixing steps, and/or between the nonproductive mixing step and the productive mixing step.

The productive mixing step can be conducted using a kneading machine such as open rolls or Banbury mixer. The pellets, a vulcanizing agent and a vulcanization accelerator are added to the kneading machine together with the nonproductive rubber mixture, followed by mixing, and the resulting mixture is discharged from the kneading machine at a given discharge temperature. The mixing temperature in the productive mixing step (for example, discharge temperature from the kneading machine) is preferably 120° C. or lower as described above, more preferably from 70 to 110° C., and still more preferably from 80 to 100° C.

In the case of adding at least one kind of porous particles selected from the group consisting of the pulverized product of porous carbonized material and porous cellulose particles to the rubber composition, the rubber composition may be prepared as follows as one embodiment. The porous particles and the pellets are previously mixed with each other, and the mixture obtained may be added to and mixed with the rubber component. The mixing of the porous particles and pellets can be conducted by stirring those using, for example, a stirrer having propeller type impellers. The stirring is preferably carried out under the conditions that the pellets and porous particles do not deform by heat and shear. Thus, it is considered that the effect of incorporating water contained in the pellets in pores of the porous particles is increased by previously mixing the pellets with the porous particles, thereby a foaming ratio can be improved. As a result, the effect of improving on-ice performance can be enhanced. It is preferred that the mixture of the porous particles and the pellets is introduced in the kneading machine together with a vulcanizing agent in the productive mixing step, followed by mixing at a mixing temperature of 120° C. or lower, similar to the case of the pellets.

Unvulcanized tire is produced using the unvulcanized rubber composition thus prepared. The production of the unvulcanized tire can be conducted utilizing extrusion or the like according to the conventional methods. As one preferred embodiment, the rubber composition is extruded at a temperature of 120° C. or lower using an extruder, the unvulcanized rubber extruded is cooled with water, and an unvulcanized tire may be produced using the unvulcanized rubber. By setting the temperature at the extrusion to 120° C. or lower, water contained in the pellets can be suppressed from evaporating before the vulcanization molding step and discharging outside, and the foaming effect in the vulcanization molding step can be enhanced. Furthermore, by cooling the unvulcanized rubber after extrusion with water, the water content in the pellets contained in the unvulcanized rubber can be restored or increased, and as a result, the foaming effect in the vulcanization molding step can be enhanced.

The unvulcanized rubber to be extruded into a given shape by an extruder is preferably a tread rubber member. As the method for producing the unvulcanized tire (green tire) by using the unvulcanized tread rubber member and combining it with other member such as an unvulcanized side wall rubber member, the conventional method can be applied.

The unvulcanized tire produced as above is vulcanization molded in the vulcanization molding step. The vulcanization molding can be conducted using a molding mold according to the conventional method. As one preferred embodiment, in the case where the melting temperature of the pellets is 150° C. or higher, the unvulcanized tire is vulcanization molded at a temperature of 150° C. or higher. This melts the pellets in the vulcanization molding step and can enhance the foaming effect. Therefore, in a tire according to one embodiment, the pellets in the foamed rubber constituting a tread rubber part are not present in the original form, and may be present in the state that the pellets melt, thereby collapsing or breaking, and cannot be visually confirmed. The vulcanization temperature is preferably the melting temperature or higher of the pellets, more preferably from 150 to 180° C., and still more preferably from 160 to 180° C.

The tire according to the present embodiment is provided with a tread rubber part comprising a foamed rubber formed by the rubber composition. Examples of the tire include pneumatic tires for various uses, such as for passenger cars or for heavy load of trucks or buses. The tire is preferably winter tires such as studless tires or snow tires. The tread rubber part is a rubber part constituting a ground-contact surface of a tire. The tread rubber part of the tire includes a tread rubber part comprising a two-layer structure of a cap rubber and a base rubber, and a tread rubber part comprising a single-layer structure in which a cap rubber and a base rubber are integrated. The rubber composition may be used in a rubber constituting a ground-contact surface. Therefore, in the case of a single-layer structure, the tread rubber part may be formed by the rubber composition, and in the case of a two-layer structure, the cap rubber may be formed by the rubber composition. The foaming ratio of the foamed rubber is not particularly limited, and may be, for example, from 3 to 50%, and may be from 5 to 40%.

As described above, the rubber composition according to the present embodiment contains the pellets comprising a mixture of paper powder and starch and containing water. Therefore, the tread rubber part becomes foamed rubber by that water vapor foaming occurs by the water during the vulcanization molding of a tire. As a result, the foamed rubber develops the removal effect of water screen present on an ice-covered road surface, thereby enhancing on-ice performance. Furthermore, the foamed rubber contains paper powder and starch, derived from the pellets. Therefore, water absorption effect and scratch effect by those are developed, thereby on-ice performance can be enhanced. In other words, the pellets not only act as a foaming agent, but contribute to the enhancement of on-ice performance by paper powder and starch remained after foaming. Furthermore, the pellets comprise paper powder (particularly, powder comprising used paper recycled) and naturally derived starch, as main components. Therefore, this brings about low environmental load and excellent low cost.

EXAMPLES

Examples of the present invention are described below, but the present invention is not construed as being limited to those examples.

Details of each component used in examples and comparative examples are as follows.

NR Natural rubber, RSS#3

BR "BR01" manufactured by JSR Corporation

Carbon black: "SEAST KH (N339)" manufactured by Tokai Carbon Co., Ltd. ($N_2$SA: 93 m$^2$/g, DBP: 119 ml/100 g)

Silica: "NIPSIL AQ" manufactured by Tosoh Silica Corporation (BET: 205 m$^2$/g)

Silane coupling agent: "Si75" manufactured by Degussa

Paraffin oil: "JOMO PROCESS P200" manufactured by JX Nippon Oil & Sun-Energy Corporation Stearic acid: "LUNAC S-20" manufactured by Kao Corporation Zinc flower: "Zinc Flower #1" manufactured by Mitsui Mining & Smelting Co., Ltd.

Age resister: "ANTIGEN 6C" manufactured by Sumitomo Chemical Co., Ltd.

Wax: "OZOACE 0355" manufactured by Nippon Seiro Co., Ltd.

Vulcanization accelerator: "SOXINOL CZ" manufactured by Sumitomo Chemical Co., Ltd.

Sulfur: "POWDERED SULFUR" manufactured by Tsurumi Chemical Industry Co., Ltd.

Vegetable granules: Granules obtained by subjecting pulverized walnut shells ("SOFT GRIT #46" manufactured by Nippon Walnut Co., Ltd.) to surface treatment with RFL treating liquid (comprising a mixture of resorcin-formalin resin initial condensate and latex, as a main component) according to the method described in paragraph 0015 of JP-A-10-7841 (D90 of vegetable granules after treatment: 300 μm)

Porous cellulose particles: "VISCOPEARL-MINI" manufactured by Rengo Co., Ltd. (porosity: 80%, average particle diameter: 700 μm, ratio of long diameter/short diameter of particles: 1.1)

Pulverized product of bamboo charcoal: Pulverized product of bamboo charcoal obtained by pulverizing bamboo charcoal of moso bamboo ("Charcoal #1, manufactured by Miyazaki Doko Co., Ltd.) with hummer mill and classifying the pulverized product obtained by a sieve (120 mesh) (D90: 100 μm)

Pellet 1: According to the method described in JP-A-2004-018603, 35 parts by mass of paper powder obtained by finely pulverizing waste used paper and 65 parts by mass of powdery starch were introduced in a kneading machine together with water, and those powders were mixed together with water to obtain a clay-like fluid mixture having viscosity. Using the mixture, columnar pellets 1 having a diameter of 2 mm and a length of 3 mm were prepared using an extrusion granulator. The pellets 1 obtained comprise 35% of paper powder and 65% of starch, in dry mass basis.

Water content was 12 mass %, and melting temperature was from 150 to 160° C. Average particle diameter of the paper powder was 50 μm, and average particle diameter of the powdery starch was 30 μm.

Pellets 2 to 4: The pellet 1 was allowed to stand in an atmosphere in which temperature and humidity were fixed, for a fixed time to dry or wet, thereby adjusting water content. Thus, pellets 2 to 4 were prepared. The pellet 2 had water content of 20 mass %, the pellet 3 had water content of 35 mass %, and the pellet 4 had water content of 3 mass %.

Pre mixture: A mixture of 100 parts by mass of the pellet 2 and 60 parts by mass of porous cellulose particles ("VISCOPEARL-MINI" manufactured by Rengo Co., Ltd.). The pellet 2 and porous cellulose particles were introduced in a given vessel, and the resulting mixture was stirred by a general stirrer having propeller type impellers in the number of revolutions of 60/min for 30 minutes while being careful such that the pellet and porous cellulose particles do not deform by heat and shear. Thus, the pre mixture was prepared.

Measurement and evaluation methods in the examples and comparative examples are as follows.

Melting temperature of pellets: 1.8 Liters Banbury mixer (manufactured by Kobe Steel, Ltd.) was used. Pellets were added to the formulation in the nonproductive mixing step shown in Example 1 of Table 1 below (the amount of pellets added is 10 parts by mass per 100 parts by mass of a rubber component). After the mixing temperature reached 100° C., a rubber mixture was discharged by changing discharge temperature every 10° C. from 130° C. while continuing the mixing in a temperature rising rate of 20° C. per minute by controlling the number of revolutions. It was visually confirmed as to whether or not the pellets remain in the rubber mixture obtained. The pellet 1 in the rubber mixture was easily confirmed visually at the discharge temperature of 140° C. or lower. However, change was slightly observed in the shape and size of the pellet 1 at 150° C., and the pellet 1 could not be visually observed at 160° C. Therefore, the melting temperature of the pellet 1 was from 150 to 160° C.

Water content of pellets: Measured by Karl Fischer method according to JIS K0113. "CA-200" manufactured by Mitsubishi Chemical Analytech Co., Ltd. was used for the measurement.

Foaming ratio of foamed rubber: Cross-section of a vulcanized rubber sample vulcanized at 160° C. for 20 minutes was observed with a color laser microscope ("VK-8510" manufactured by Keyence Corporation), and a foaming ratio per unit area was calculated.

Hardness: Hardness in the atmosphere of 23° C. and −5° C. of a vulcanized rubber sample (thickness: 12 mm or more) obtained by vulcanization at 160° C. for 20 minutes was measured with durometer type A according to JIS K6253.

On-ice braking performance: Four test tires were mounted on a 4WD car of 2,000 cc displacement. ABS was operated from 40 km/hr running on an ice-covered road (air temperature: −3±3° C.) and a braking distance was measured (average value of n=10). Inverse number of a braking distance was indicated by an index as the value of Comparative Example 1 being 100. Braking distance is short as the index is increased, and large index indicates excellent braking performance on an ice-covered road surface.

Abrasion resistance: Four test tires were mounted on a 4WD car of 2,000 cc displacement, and the car was run over a distance of 10,000 km while making rotation between the tires of the right side and the tires of left side every 2,500 km on a general dry road surface. An average value of tread groove depths of four tires after running was indicated by an index as Comparative Example 1 being 100. Abrasion resistance is good as the numerical value is large. Up to −5% to Comparative Example 1 as a control is an allowable range.

Rubber compositions of Examples and Comparative Examples were prepared as follows. 20 Liters Banbury mixer (manufactured by Kobe Steel, Ltd.) was used. Components other than pellets, sulfur and a vulcanization accelerator were added and mixed according to the formulations (parts by mass) shown in Table 1 below in a nonproductive mixing step (discharge temperature: 160° C.). Pellets, sulfur and a vulcanization accelerator were added to and mixed with the mixture obtained above in a productive mixing step. Thus, a rubber composition for a tire tread was prepared. The mixing in the productive mixing step was carried out at 100° C. or lower. Comparative Example 1 is a control and pellets were not introduced. In Example 8, a pre mixture obtained by stirring and mixing pellets and porous cellulose particles prior to the mixing using Banbury mixer was used, and the pre mixture was added to the nonproductive rubber mixture together with a vulcanizing agent and a vulcanization accelerator in the productive mixing step, followed by mixing.

The rubber composition obtained was extrusion molded into a given tread rubber shape using an extruder. Preset temperature in the extruder was 100° C. or lower. The unvulcanized tread rubber member extruded was cooled with water by passing through a bath. An unvulcanized tire was produced using the tread rubber member according to the conventional method, and the unvulcanized tire was set to a mold and vulcanization molded at 160° C. for 20 minutes. Thus, a studless tire for passenger cars (tire size: 185/65R14) was manufactured. In Example 9, a tire was manufactured in the same manner as in Example 3, except that water cooling after extrusion was not carried out.

Regarding each rubber composition of Examples and Comparative Examples, a vulcanized rubber sample having a given shape was prepared from the unvulcanized tread rubber member after extrusion molding, and foaming ratio and hardness thereof were measured. On-ice braking performance and abrasion resistance of each pneumatic tire were evaluated (rim used: 14×5.5JJ).

The results obtained are shown in Table 1 below. In Examples 1 to 3 in which the pellets having given water content were added as compared with Comparative Example 1 as a control, a foamed rubber was formed and the improvement effect of on-ice performance was recognized. In Example 2 in which the water content of the pellets is high as compared with Example 1, the foaming ratio was increased and further improvement effect was observed in on-ice performance. In Example 3, the water content is higher than that in Example 2. Therefore, further increase of the foaming ratio and the improvement of on-ice performance were observed. On the other hand, in Comparative Example 2, the water content of the pellets was low. Therefore, the vulcanized rubber did not almost foam, and the improvement effect of on-ice performance was small.

In Example 4, the amount of the pellets added was increased. As a result, the improvement of a foaming ratio was observed, and the on-ice-performance was further enhanced. On the other hand, in Comparative Example 3, the amount of the pellets added is small. Therefore, rubber foaming was not almost observed, and the improvement effect of on-ice performance was not developed.

In Comparative Example 4, the amount of the pellets added is too large. Therefore, the foaming effect and the improvement effect of on-ice performance were excellent, but abrasion resistance was remarkably deteriorated and hardness was high. Furthermore, because of too large addition amount, there was a concern that the pellets do not completely melt and remain.

In Example 5, the vegetable granules were added to Example 2. The change of a foaming ratio is not almost observed, but further improvement effect of on-ice performance was observed. In Examples 6 and 7, porous particles such as porous cellulose particles or a pulverized product of bamboo charcoal were added to Example 2. As a result, the foaming ratio was increased, and further improvement effect of on-ice performance was obtained. The factor is assumed that by further using porous particles, a part of water contained in the pellets is incorporated in pores of the porous particles, and as a result, the amount of water discharged outside during the mixing of the rubber composition can be reduced, and the rubber composition was efficiently foamed. From the comparison between Example 6 and Example 7, the porous cellulose particles were excellent in effect than the pulverized product of bamboo charcoal, as the porous particles to be used together with the pellets.

In Example 8, stirring and mixing of the pellets and the porous particles were carried out as a mixing pretreatment of the rubber composition in Example 6, and further improvement effect was observed in the foaming ratio and on-ice performance. Furthermore, by previously mixing the porous particles and the pellets, the effect of incorporating the water contained in the pellets in pores of the porous particles is enhanced, and larger amount of water remains until vulcanization molding. Therefore, it is considered that the foaming ratio was improved and on-ice performance was enhanced.

In Example 3 in which water cooling was conducted after extrusion, the foaming ratio was high and the on-ice performance was excellent, as compared with Example 9 in which water cooling was not conducted.

TABLE 1

| | Com. Ex. 1 | Ex. 1 | Ex. 2 | Ex. 3 | Com. Ex. 2 | Ex. 4 | Com. Ex. 3 | Com. Ex. 4 | Ex. 5 | Ex. 6 | Ex. 7 | Ex. 8 | Ex. 9 |
|---|---|---|---|---|---|---|---|---|---|---|---|---|---|
| Formulation (parts by mass) | | | | | | | | | | | | | |
| Nonproductive mixing step: | | | | | | | | | | | | | |
| NR | 50 | 50 | 50 | 50 | 50 | 50 | 50 | 50 | 50 | 50 | 50 | 50 | 50 |
| BR | 50 | 50 | 50 | 50 | 50 | 50 | 50 | 50 | 50 | 50 | 50 | 50 | 50 |
| Carbon black | 25 | 25 | 25 | 25 | 25 | 25 | 25 | 25 | 25 | 25 | 25 | 25 | 25 |
| Silica | 25 | 25 | 25 | 25 | 25 | 25 | 25 | 25 | 25 | 25 | 25 | 25 | 25 |
| Silane coupling agent | 2 | 2 | 2 | 2 | 2 | 2 | 2 | 2 | 2 | 2 | 2 | 2 | 2 |
| Paraffin oil | 20 | 20 | 20 | 20 | 20 | 20 | 20 | 20 | 20 | 20 | 20 | 20 | 20 |
| Stearic acid | 2 | 2 | 2 | 2 | 2 | 2 | 2 | 2 | 2 | 2 | 2 | 2 | 2 |
| Zinc flower | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |
| Vegetable granules | | | | | | | | | 3 | | | | |
| Porous cellulose particles | | | | | | | | | | 3 | | | |
| Pulverized product of bamboo charcoal | | | | | | | | | | | 3 | | |
| Productive mixing step: | | | | | | | | | | | | | |
| Pellet 1 (water content: 12%) | | 5 | | | | | | | | | | | |
| Pellet 2 (water content: 20%) | | | 5 | | | 10 | 0.3 | 30 | 5 | 5 | 5 | | |
| Pellet 3 (water content: 35%) | | | | 5 | | | | | | | | | 5 |
| Pellet 4 (water content: 3%) | | | | | 5 | | | | | | | | |
| Pre mixture | | | | | | | | | | | | 8 | |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 | 2 |
| Foaming ratio (%) | 0 | 8 | 18 | 30 | 3 | 38 | 0 | 52 | 20 | 30 | 24 | 38 | 22 |
| Hardness 23° C. | A48 | A49 | A49 | A48 | A49 | A48 | A48 | A52 | A49 | A48 | A49 | A49 | A48 |
| Hardness −5° C. | A51 | A50 | A50 | A50 | A52 | A50 | A51 | A55 | A51 | A50 | A50 | A51 | A50 |
| On-ice braking performance (index) | 100 | 110 | 115 | 118 | 102 | 128 | 100 | 130 | 118 | 128 | 120 | 135 | 115 |
| Abrasion resistance (index) | 100 | 98 | 98 | 98 | 96 | 95 | 100 | 65 | 95 | 95 | 97 | 95 | 98 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition for a tire comprising 100 parts by mass of a rubber component comprising diene rubber, and from 0.5 to 20 parts by mass of pellets comprising paper powder and starch and having water content of 5 mass % or more.

2. The rubber composition for a tire according to claim 1, wherein the pellets have a melting temperature of 150° C. or higher.

3. The rubber composition for a tire according to claim 1, wherein the content of the paper powder contained in the pellets is 20 mass % or more in dry mass basis.

4. The rubber composition for a tire according to claim 1, wherein the paper powder is pulverized used paper powder.

5. The rubber composition for a tire according to claim 1, further comprising at least one selected from the group consisting of a pulverized product of porous carbonized material of a plant, porous cellulose particles and vegetable granules.

6. A method for manufacturing a tire, comprising:
a nonproductive mixing step of adding a filler to a rubber component comprising diene rubber, followed by mixing to prepare a nonproductive rubber mixture,
a productive mixing step of adding pellets to the nonproductive rubber mixture together with a vulcanizing agent, followed by mixing to prepare a rubber composition, wherein the pellets comprise paper powder and starch and have water content of 5 mass % or more and there is 0.5 to 20 parts by mass of the pellets based on 100 parts by mass of the rubber component, and wherein the mixing temperature in the productive mixing step is 120° C. or lower,
producing an unvulcanized tire using the rubber composition obtained, and
vulcanization molding the unvulcanized tire.

7. The method for manufacturing a tire according to claim 6, wherein the pellets have a melting temperature of 150° C. or higher, and the unvulcanized tire is vulcanization molded at a temperature of 150° C. or higher.

8. The method for manufacturing a tire according to claim 6, wherein the rubber composition is extruded at a temperature of 120° C. or lower using an extruder, unvulcanized rubber extruded is cooled with water, and the unvulcanized tire is produced using the unvulcanized rubber.

9. The method for manufacturing a tire according to claim 6, wherein at least one selected from the group consisting of a pulverized product of porous carbonized material of a plant and porous cellulose particles is previously mixed with the pellets, and the mixture obtained is added to and mixed with the rubber component.

10. The rubber composition for a tire according to claim 1, further comprising at least one selected from the group consisting of a pulverized product of bamboo charcoal, porous cellulose particles, and vegetable granules.

11. The method for manufacturing a tire according to claim 6, wherein at least one selected from the group consisting of a pulverized product of bamboo charcoal and porous cellulose particles is previously mixed with the pellets, and the mixture obtained is added to and mixed with the rubber component.

12. The method for manufacturing a tire according to claim 6, wherein the rubber composition becomes a foamed rubber by vaporization heat foaming during the vulcanization molding of the unvulcanized tire.

* * * * *